US006727986B1

(12) United States Patent
Serruys

(10) Patent No.: US 6,727,986 B1
(45) Date of Patent: Apr. 27, 2004

(54) METHOD AND DEVICE FOR MEASURING A FOLDING ANGLE OF A SHEET IN A FOLDING MACHINE

(75) Inventor: Wim Serruys, Gullegem (BE)

(73) Assignee: LVD Company NV, Gullegem (BE)

( * ) Notice: Subject to any disclaimer, the term of this patent is extended or adjusted under 35 U.S.C. 154(b) by 65 days.

(21) Appl. No.: 09/688,649

(22) Filed: Oct. 16, 2000

(30) Foreign Application Priority Data

Nov. 19, 1999 (EP) .............................................. 99203884

(51) Int. Cl.[7] ................................................. G01C 1/00
(52) U.S. Cl. ................................ 356/152.1; 356/152.2; 356/139.03; 702/151; 493/23; 493/13
(58) Field of Search ................................ 493/9, 10, 17, 493/23, 13, 34, 431, 426; 356/138, 152.1, 152.2, 139.03; 702/151, 150

(56) References Cited

U.S. PATENT DOCUMENTS

| | | | |
|---|---|---|---|
| 4,564,765 A | | 1/1986 | Blaich .......................... 250/561 |
| 4,942,618 A | * | 7/1990 | Sumi et al. .................. 356/609 |
| 5,046,852 A | * | 9/1991 | Hametner et al. ........... 356/398 |
| 5,062,283 A | * | 11/1991 | Miyagawa et al. ........... 72/18.1 |
| 5,129,010 A | * | 7/1992 | Higuchi et al. .............. 348/136 |
| 5,231,678 A | * | 7/1993 | Takatori et al. .............. 356/603 |
| 5,311,289 A | * | 5/1994 | Yamaoka et al. ............ 356/606 |
| 5,329,597 A | * | 7/1994 | Kouno et al. ................ 348/142 |
| 5,488,470 A | * | 1/1996 | Ooenoki ....................... 356/138 |
| 5,531,087 A | * | 7/1996 | Kitabayashi et al. ........ 72/31.01 |
| 5,661,671 A | * | 8/1997 | Ooenoki et al. ............. 356/398 |
| 5,899,964 A | | 5/1999 | Ooenoki et al. ............. 702/150 |
| 6,163,374 A | * | 12/2000 | Otani et al. .................. 348/136 |
| 6,268,912 B1 | * | 7/2001 | Brinkman et al. ........... 356/138 |

FOREIGN PATENT DOCUMENTS

| | | |
|---|---|---|
| DE | 1 99 30 745 A1 | 1/2000 |
| EP | 0 335 035 | 10/1989 |
| EP | 0 915 320 A1 | 2/1997 |

OTHER PUBLICATIONS

Abstract of German Patent Application DE 199 30 745 A1 (Jan. 5, 2000).

* cited by examiner

*Primary Examiner*—Rinaldi I. Rada
*Assistant Examiner*—Louis Tran
(74) *Attorney, Agent, or Firm*—Maria Parrish Tungol

(57) ABSTRACT

Method and device for measuring a folding angle of a sheet (6,25,26) in a folding machine, whereby a number of distances are measured in a plane (28) that crosses the sheet (6,25,26) and the element (4,24,7), whereby a distance profile (19) of the measured distances is determined, and whereby the folding angle (A) of the sheet (6,25,26) is determined as a function of the angle (B,B1,B2) between the sheet (6,25,26) and the element (4,24,7).

10 Claims, 3 Drawing Sheets

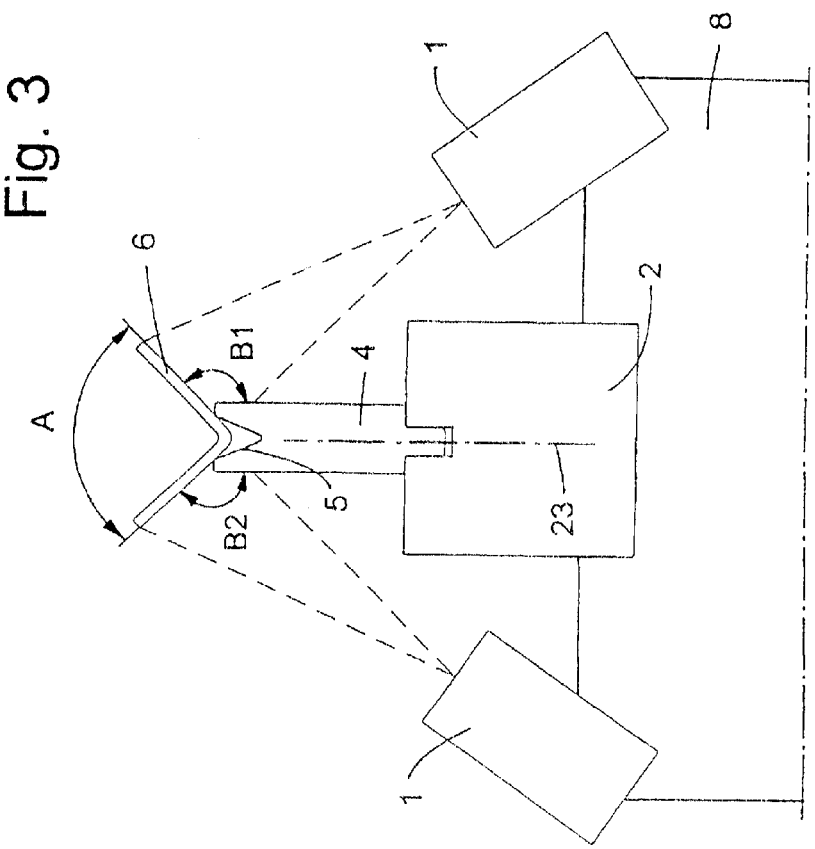
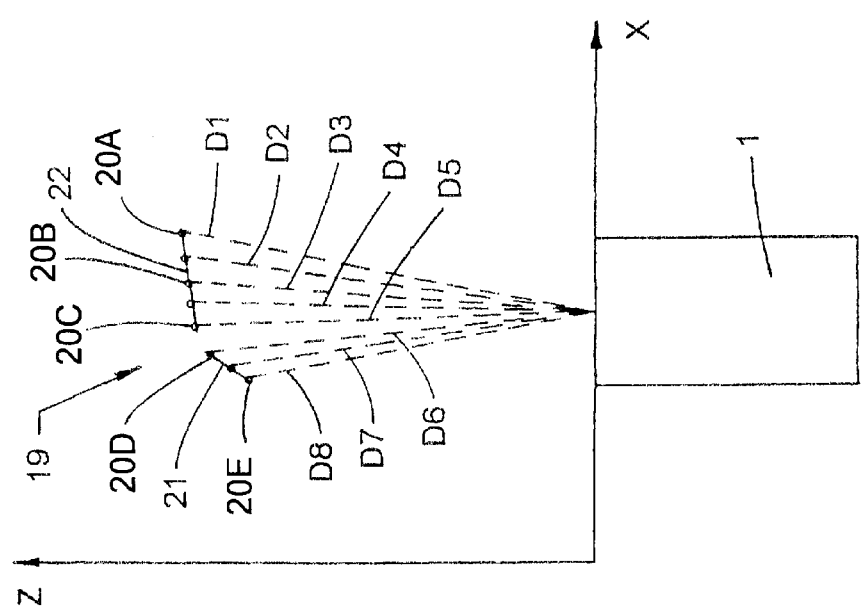

METHOD AND DEVICE FOR MEASURING A FOLDING ANGLE OF A SHEET IN A FOLDING MACHINE

The invention relates to a method and a device for measuring a folding angle of a sheet, and to a folding machine.

BACKGROUND OF THE INVENTION

From EP -A 715 552 a method is known for optimizing the folding of a sheet between a punch and a die of a folding machine, to a desired folding angle. During the folding of the sheet, the folding angle of the sheet is measured and the movement of the folding punch is controlled by an adjustable controller as a function of the measured folding angle. The folding angle is measured by a tracer placed in a reference position. The tracer comprises a telescopic device which can be placed against a point on the underside of the sheet and a distance sensor for measuring the position of the telescopic device. The folding angle is determined as a function of the signal of the distance sensor. This method requires a calibration using at least one sample piece with a known folding angle to determine the relationship between the signal of the distance sensor and the folding angle. Furthermore, the tracer must be placed very precisely in the reference position.

From EP -A 470 263 a method is known in which the folding angle is measured by a vision system. This vision system comprises a plane light source and an image pickup device for picking up an intersection line pattern of light induced onto the surface of the sheet by the plane light source. The vision system is placed in a reference position in accordance with the co-ordinate axis of a co-ordinate plane. The folding angle of the sheet is calculated based on the positional relationships between the pick-up direction, the direction of the emitted light, the intersection line and the co-ordinate axis of the co-ordinate plane. This method requires a precise attachment of the vision system with respect to the sheet and a calibration using a sample piece of a known angle. Furthermore, this vision system has to be attached a well-defined distance away from the sheet, thereby enabling the emitted light to reach the focal point of the image pickup device. This can lead to the use of a non-standard support die or punch, with the vision system built in.

The aim of this invention is a method and a device for measuring a folding angle of a sheet without the need for a precise attachment or a precise positioning of the device according to the invention with respect to the sheet and/or the folding machine.

To this end, the method according to the invention comprises the measurement, on at least one side of an element, of a number of distances in a plane that crosses the sheet and the element; said distances comprising a number of distances between a measuring tool and different points on the sheet and a number of distances between a measuring tool and different points on the element; determining a distance profile of the measured distances; determining two straight lines based on values of the distance profile, and determining the angle between sheet and element from the angle between the two straight lines, so as to determine the folding angle of the sheet as a function of the thus determined angle between the sheet and the element.

The method according to the invention offers the advantage that the folding angle of the sheet can be determined irrespective of the position of the measuring tool relative to the sheet. This method further offers the advantage that the folding angle can be determined very accurately, even if the measured distances were not measured very accurately. Because of these advantages, the method according to the invention is very suitable for measuring a folding angle of a folding sheet in a folding machine.

In a preferred embodiment, the method comprises the measurement, on two sides of an element of a number of said distances in a respective plane that crosses the sheet and the element; determining, for each side of the element, a respective distance profile of the measured distances, determining, for each distance profile a set of two straight lines, based on values of the distance profile, and determining a respective angle between sheet and element from the angle between the straight lines of each set, so as to determine the folding angle of the sheet as a function of the two determined angles between the sheet and the element.

In a preferred embodiment, the method comprises the measurement of a number of said distances in a plane that crosses the sheet and the element perpendicular to the longitudinal direction of the sheet and the element. This offers the advantage that no calibration is necessary in order to determine the angle between sheet and element.

Preferably, the folding angle is measured during the folding of the sheet between two elements in a folding machine.

In an embodiment, a distance profile of the measured distances is determined as a profile in a co-ordinate system with respect to the measuring tool.

In another embodiment, the two straight lines are determined statistically, based on values of the distance profile.

The device for measuring a folding angle of a sheet according to the invention comprises a measuring tool for measuring, on a side of an element, a number of distances in a plane that crosses the sheet and the element, said distances comprising a number of distances between the measuring tool and different points on the sheet and a number of distances between the measuring tool and different points on the element; means for determining a distance profile of the measured distances; means for determining two straight lines based on values of the distance profile and means for determining the angle between sheet and element from the angle between the two straight lines so as to determine the folding angle of the sheet as a function of the thus determined angle between the sheet and the element. A device according to the invention can be used to measure a folding angle of a sheet in a folding machine and will not impede the folding of the sheet in the folding machine, since all parts of the said device can be arranged far enough away from the support die and the punch. In a preferred embodiment, the device comprises means for mounting the measuring for measuring a number of distances in a plane that crosses the sheet and the element perpendicular to the longitudinal direction of the sheet and the element.

In a preferred embodiment, the measuring tool comprises a scanner that is rotationally supported and comprises a means for controlling the rotational position of the scanner, in order to determine in each rotational position of the scanner the distance between the scanner and the sheet or the distance between the scanner and the element.

In a preferred embodiment, the element is an integral part of a folding machine. Preferably, the element consists of a support die for supporting the sheet in a folding machine.

The folding machine according to the invention comprises at least one device according to the invention, said device being mounted on a side of an element of the folding machine. Preferably, the folding machine comprises two devices according to the invention, said devices being mounted on different sides of an element of the folding machine. Preferably, the element consists of a support die for supporting the sheet in a folding machine.

A folding machine according to the invention offers the advantage that the folding angle of a sheet can be measured easily during the folding of the sheet, and that the folding machine can be equipped with a standard support die and a standard punch.

BRIEF DESCRIPTION OF THE DRAWINGS

The above and other objects, features and advantages of the invention will become more readily apparent from the following description, where reference may be made to the enclosed drawings in which:

FIG. 2 shows a distance profile measured by a device according to FIG. 1;

FIG. 3 shows an alternative for FIG. 1;

DETAILED DESCRIPTION OF THE INVENTION

Figure 1:
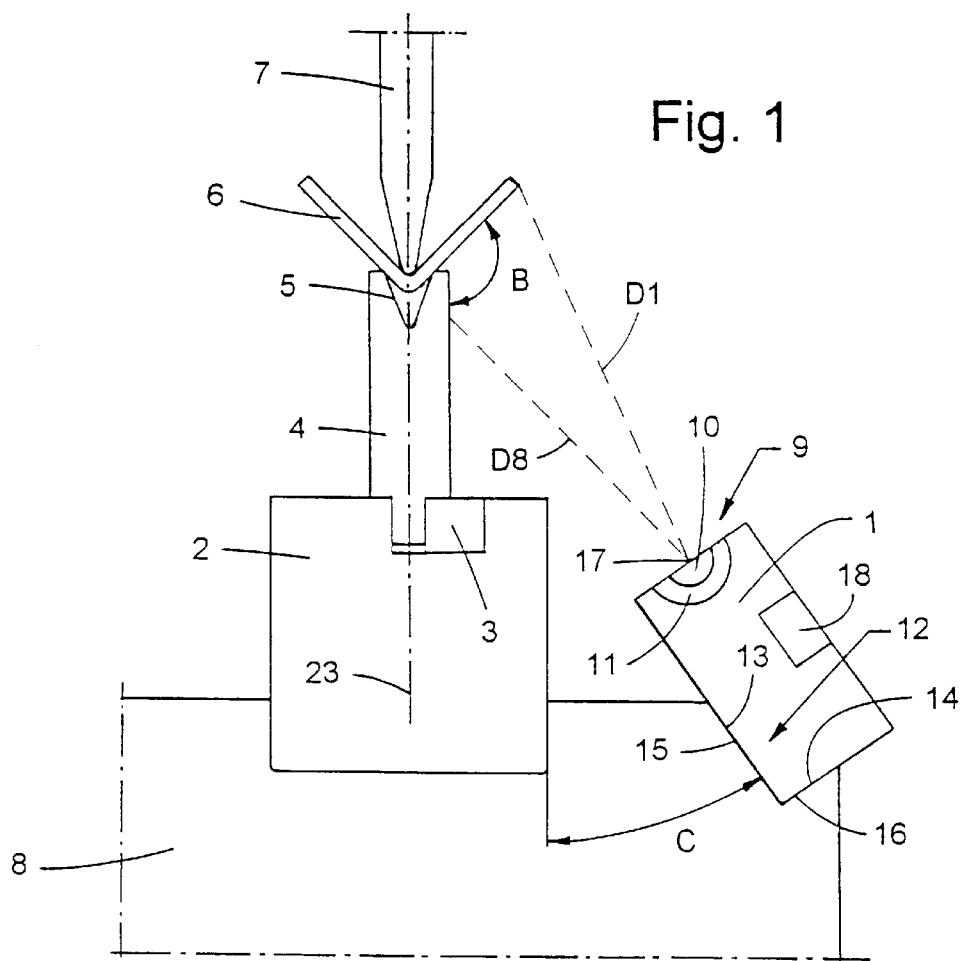
FIG. 1 shows a side view of a device according to the invention and a sheet supported on a support die of a folding machine.

In FIG. 1 a device 1 according to the invention is shown, which is mounted on the right-hand side of a folding machine. The folding machine comprises a fixedly supported table 2. The table 2 comprises a key system 3 for fastening an element 4. The element 4 consists of a support die having a recess 5 for supporting a sheet 6. The folding machine further comprises a second element 7 consisting of a moveable punch for folding a sheet 6 in a known manner between the two elements 4 and 7. During the folding of the sheet 6, the longitudinal direction of the sheet 6 is also the longitudinal direction of both elements 4 and 7. The folding machine further comprises a framework 8 for supporting the table 2 and for supporting the device 1 according to the invention. This framework 8 also supports the drive system (not shown) for the element 7, said drive system comprises, for example, a known adjustable hydraulic pressure device in order to fold a sheet 6 to a well-defined folding angle. The device 1 comprises a measuring tool 9, comprising a rotationally supported scanner 10. This scanner 10 can measure and determine a distance between the scanner 10 and a distant object. A known scanner 10 is based on the sonar principle, on the principle of laser triangulation or on another known principle. The measuring tool 9 further comprises a control means 11 for controlling the rotational position of the scanner 10. Such a device 1 can determine, in each rotational position of the scanner 10, the distance between scanner 10 and sheet 6 or, alternatively, the distance between scanner 10 and element 4. An example of such a device 1 is known as a "MEL Line Scanner M2D". This is a laser scanner for profile contour scanning, marketed by Microelektronik GmbH, Eching/Germany.

According to the invention, the device 1 is mounted at an angle C with respect to the table 2 in such a way that the measuring tool 9 can measure the distances in a plane that crosses the sheet 6 and the element 4 perpendicular to the longitudinal direction of sheet 6 and element 4. To this end, the device 1 further comprises a mounting device 12 for mounting the device 1 and the measuring tool 9 with respect to the framework 8. In an embodiment, the mounting device 12 comprises two reference surfaces 13 and 14 that can be supported on two reference surfaces 15 and 16 of the framework 8, whereby the reference surfaces 13 and 14 and the reference surfaces 15 and 16 cross each other in the longitudinal direction of the sheet 6 and the element 4. By supporting the scanner 10 for rotation about an axis 17, parallel to the line where the two surfaces 13 and 14 intersect, the scanner 10 will be set up for measuring distances in a plane 28 (FIG. 6) that crosses both sheet 6 and element 4 perpendicular to the said longitudinal direction. This plane coincides with the surface of the page of the drawing in FIG. 1.

As shown in FIG. 2, the measuring tool 9 measures a fixed number of distances D1, D2, D3, D4 and D5 between the measuring tool 9 and different points on the underside of the sheet 6 facing device 1. In the same way, the measuring tool 9 measures a fixed number of distances D6, D7 and D8 between the measuring tool 9 and different points on the side of element 4 facing device 1. If using a scanner 10 based on the sonar principle or on the laser triangulation principle, the measured distance will not be that accurate. Such a scanner 10 is able to measure a lot of distances in a short space of time.

Processing means 18 (FIG. 1) are provided for determining a distance profile 19 which comprises a co-ordinate point for each measured distance in an X-Z co-ordinate system relative to the position of the measuring tool 9. The co-ordinate point for each measurement can be determined using geometrical formulae based on the measured distance and the corresponding rotational position of the scanner 10. In FIG. 2 only a few coordinate points 20A–20E are shown, although in reality the number of coordinate points is a few hundreds or even more.

Based on said distance profile 19, the means 18 determines statistically two straight lines 21 and 22. A first straight line 21 corresponds to the distance measurements between the scanner 10 and the side of element 4, while the second straight line 21 corresponds to the distance measurements between the scanner 10 and the sheet 6. To this end, the straight line 21 is determined successively starting from the left-hand side of the distance profile 19, while the straight line 21 is determined successively starting from the right-hand side of the distance profile 19. Each straight line 21 or 22 is determined as a line where the sum of each square of the difference in distance between the line and each co-ordinate point such as 20A–20D is a minimum. This successive determination of a straight line allows to establish if a further co-ordinate point corresponds to the same line or not, by checking whether the angle of a successively determined a straight line suddenly changes, or if the value of the square of the difference for the last co-ordinate point is much larger than those for previous coordinate points. Using this method, the position of the point of intersection of the two straight lines 21 and 22 is irrelevant.

The means 18 further determine the angle between the two straight lines 21 and 22 based on geometrical formulae in order to determine the angle B between the sheet 6 and the side of the element 4. Since the distances are measured in a plane perpendicular to the longitudinal direction of sheet 6 and element 4, the angle between the two straight lines 21 and 22 will be equal to the angle B between the sheet 6 and the side of the element 4 facing the device 1.

The means 18 further determine the folding angle of the sheet 6 as a function of the measured angle B between the sheet 6 and the side of the element 4. In the embodiment of FIG. 1, the folding angle can be determined as 360 degrees minus two times the said measured angle B. This assuming that while the sheet 6 is being folded, the sheet 6 is located symmetrically with respect to the symmetry line 23 of the element 4.

The method according to the invention can be used to determine the folding angle of a sheet 6 during the folding of the sheet 6 between two elements 4 and 7 in a folding machine. Successive determinations of this folding angle by the processing means 18 allow to observe any increases in the folding angle during folding, and to optimize the movement of the element 7 as a function of the measured folding angle, so as to fold a sheet 6 with a pre-determined folding angle. The control unit (not shown) of the folding machine is connected to the processing means 18 of the measuring tool 9 and to a display unit (not shown) for displaying the value of the measured folding angle.

In FIG. 3 a device 1 according to the invention is mounted on each side of the element 4 of a folding machine. The angle B1 between sheet 6 and element 4 on one side of the element 4, as well as the angle B2 between sheet 6 and element 4 on the other side of the element 4, is determined using the method as explained above for the angle B. In this case the folding angle A of the sheet 6 is determined as 360 degrees minus the sum of the angles B1 and B2. This method is advantageous whenever the sheet 6 is not located symmetrically relative to the symmetry line 23.

Figure 4:
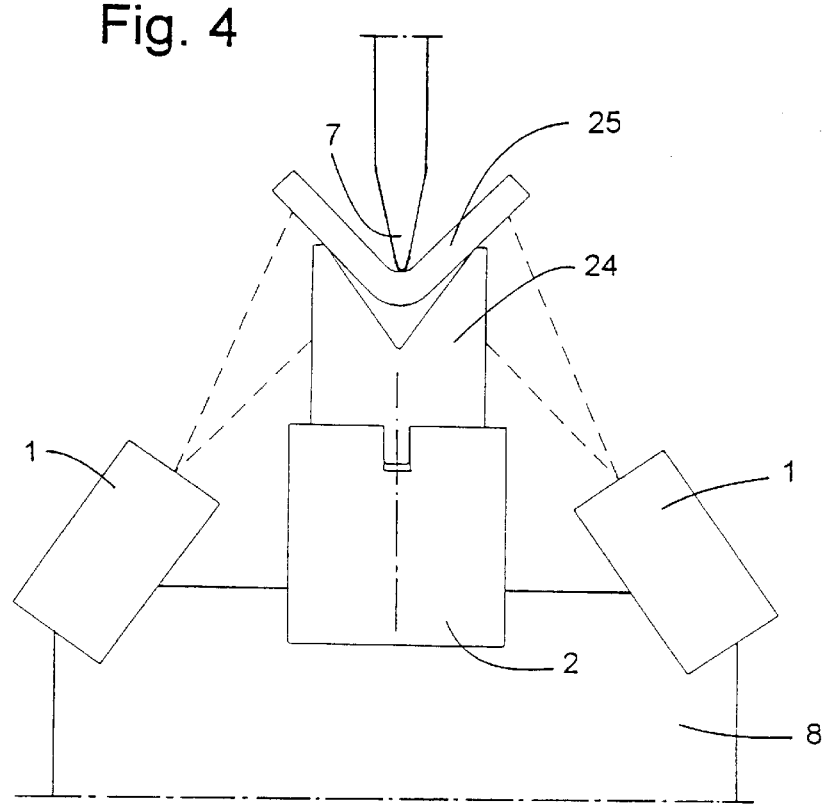
FIG. 4 shows another alternative for FIG. 1.

In FIG. 4 a folding machine is shown whereby an element 24, such as a support die, is provided which is wider than the element 4 of FIG. 3. The devices 1 according to the invention should not be moved with respect to their position in FIG. 3, in order to determine the folding angle of the sheet 25 using the method as explained above. This because the device 1 can measure values for the distance with respect to the element 24 and to the sheet 25. Hence, it is possible to exchange an element 4 or 24 of a folding machine, without having to move a device 1 according to the invention.

Figure 5:
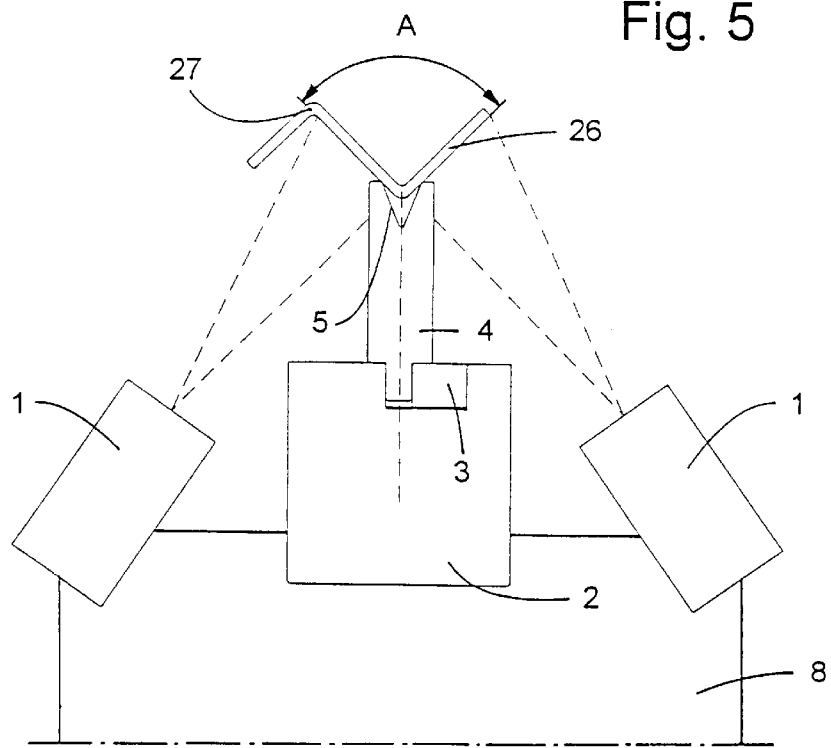
FIG. 5 shows yet another alternative for FIG. 1.

In FIG. 5 an embodiment is shown whereby a folding angle A is measured of a sheet 26 that already has another fold 27. It is clear, that this other fold 27 will not stop the device 1 according to the invention from determining the folding angle during folding of the current fold of the sheet 26.

Figure 6:
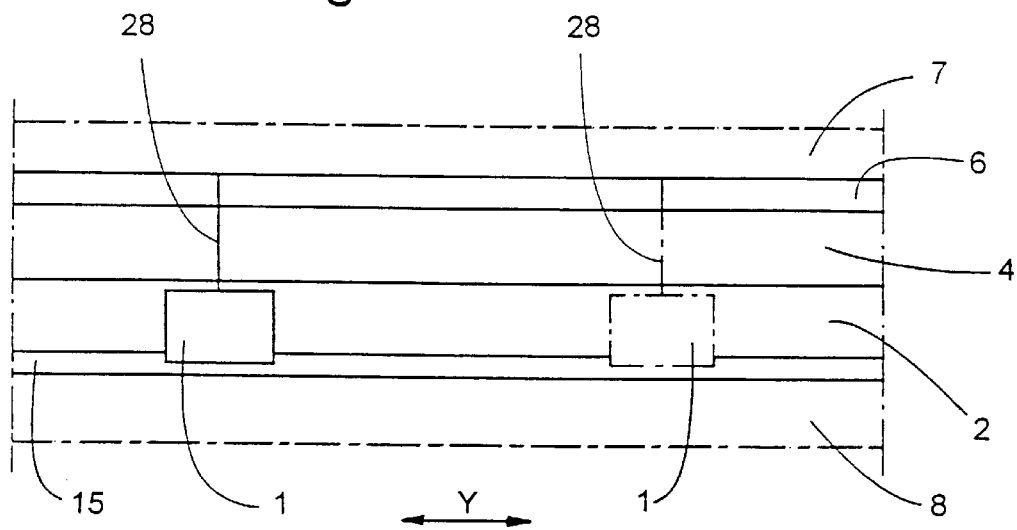
FIG. 6 shows a front view of a device according to the invention in a folding machine.

As shown in FIG. 6, the device 1 according to the invention can be used advantageously for measuring several folding angles along the longitudinal direction Y of the sheet 6. To this end, the device 1 is moved along the longitudinal direction Y of sheet 6 and element 4 in order to measure, each time, several distances in a plane 28 that crosses both sheet 6 and element 4 perpendicular to their longitudinal direction Y and also to determine, in each longitudinal position along the longitudinal direction Y, the respective folding angles of the sheet 6. To achieve this it is of course also possible to position several measuring tools side by side along the sheet 6.

The method according to the invention offers the additional advantage that the angle C of the device 1 with respect to the table 2 is not important for determining the folding angle. The absolute position of the two straight lines 21 and 22 with respect to the X-Z co-ordinate system is also irrelevant, because only the mutual positions of the two straight lines 21 and 22 matter when determining the angle between the two straight lines 21 and 22.

The method offers the additional advantage that the positioning of the device 1 closer to or further away from the sheet and the element is of no concern for determining the folding angle. This means that the absolute values for the measured distances are not important when determining the folding angle. Determining the straight lines 21 and 22 of a distance profile 19 also offers the advantage that even a less accurate measurement of the value for each distance will have a negligible effect on the thus determined folding angle. Using the method according to the invention, the angle between sheet and element can be determined much more accurately than expected based on the accuracy of the distance measurement.

When using a measuring tool based on a sonar principle or on a laser triangulation principle, it is known that the absolute value of the measured distance between the measuring tool 9 and an object will depend on the roughness or the smoothness of the surface of the object and/or on the kind of material of the object. Even if the absolute value of the measured distance is incorrect, for a definite object each value used for determining the distance profile will approximately have the same error, such that the angular orientation of the thus determined straight lines 21 and 22 with respect to the co-ordinate system will, essentially, be unaffected by the said error. For this reason, the method according to the invention offers the advantage that measurement of the folding angle using a said measuring tool 9 will be unaffected by the material and/or the properties of the surface of either sheet or element.

The method according to the invention offers the additional advantage relative to the method that uses a distance sensor to measure the absolute value of the distance between one point on a sheet and a reference position as known from EP -A 715 552, that a so-called offset error in the absolute measured value need not be determined in advance by means of calibration. Furthermore in EP -A 715 552, the tracer must be placed very precisely in the reference position and when changing an element 4 or 24 a new calibration will be necessary.

It is clear, provided the side of the element for which the distances are measured is not parallel to the symmetry line 23, for example when the sides of the element are wedge shaped, that when determining the folding angle as a function of the measured angle between sheet and element, the wedge angle of the element will have to be taken into consideration.

According to an alternative embodiment, the folding angle of the sheet is determined based on an angle measured between the sheet and the punch element 7 of the folding device. To this end, the device 1 has to be mounted such that the measuring tool 9 can measure a fixed number of distances between the measuring tool 9 and a straight and plane part of the element 7, and a fixed number of distances between the measuring tool 9 and the upper part of the sheet. For these measured distances, straight lines can then be determined in order to determine the folding angle.

In the embodiments shown in FIGS. 1 to 6, the scanner 10 is supported rotationally. According to an alternative, the scanner 10 can be moved in a transversal direction, for example along the X axis (FIG. 2), and measure in each transversal position a said distance, for example a distance along the Z axis (FIG. 2). In this way, the co-ordinate points 20 can be determined easily as a function of the transversal position of the scanner 10 and the corresponding measured distance. According to another alternative, several measuring tools 9 (comprising scanners 10) are mounted side by side along said X axis, so as to measure said distance along the Z axis.

Although preferred, it is not strictly necessary that the distances are measured in a plane 28 that crosses the sheet 6, 25, 26 and the element 4, 24, 7 perpendicular to the longitudinal direction Y of the sheet and the element. If not, the angle between the sheet and the element in a plane perpendicular to the longitudinal direction Y will have to be calculated based on the measured angle in the plane not perpendicular to the longitudinal direction Y, using geometrical formulae. In order to determine these geometrical formulae, a calibration will be necessary, whereby this embodiment would become less attractive.

It is not necessary that the element 4, 24 or 7 used in the device 1 or the method according to the invention is a support die 4 or a punch 7 of a folding machine. It is also possible that the said element is another part with a plane surface of the folding machine, the said part is at an angle to the sheet.

It is clear, that the method and the device according to the invention can also be used for determining a folding angle of a sheet outside a folding machine, for example by using the method and the device 1 according to the invention in a separate measuring device.

The purpose of the method and the device according to the invention as described above for measuring and determining the folding angle of a sheet can be used to obtain a sheet with a correct folding angle during the folding of a sheet in a folding machine. The device according to the invention can be attached, positioned or moved quite arbitrarily with respect to the sheet and/or the folding machine. It is, of course, understood that any modification, alteration and adaptation as may readily occur to those skilled in the art to which the invention pertains, falls within the spirit of the present invention, which is limited only by the scope of the claims appended hereto.

What is claimed is:

1. Device for measuring a folding angle (A) of a sheet (6,25,26), characterised in that the device (1) comprises a measuring tool (9) for measuring, on a side of an element (4,24,7), a number of distances in a plane (28) that crosses the sheet (6,25,26) and the element (4,24,7), said distances comprising a number of distances (D1–D5) between the measuring tool (9) and different points on the sheet (6,25,26) and a number of distances (D6–D8) between the measuring tool (9) and different points on the element (4,24,7); means (18) for determining a distance profile (19) of the measured distances; means (18) for determining two straight lines (21,22) based on values of the distance profile (19), and means for determining the angle (B,B1,B2) between the sheet (6,25,26) and the element (4,24,7) from the angle between the two straight lines (21, 22), so as to determine the folding angle (A) of the sheet (6,25,26) as a function of the thus determined angle (B,B1,B2) between the sheet (6,25,26) and the element (4,24,7).

2. Device according to claim 1, characterised in that the device (1) comprises means (12) for mounting the measuring tool (9) for measuring a number of distances in a plane (28) that crosses the sheet (6,25,26) and the element (4,24,7) perpendicular to the longitudinal direction (Y) of the sheet (6,25,26) and the element (4,24,7).

3. Device according to claim 1, characterised in that the measuring tool (9) comprises a scanner (10) that is rotationally supported and comprises a means (11) for controlling the rotational position of the scanner (10), in order to determine in each rotational position of the scanner (10) the distance between the scanner (10) and the sheet (6,25,26) or the distance between the scanner (10) and the element (4,24,7).

4. Device according to claim 1, characterised in that the element (4,24,7) comprises a support die (4,24) for supporting the sheet (6,25,26) in a folding machine.

5. Device according to claim 1, characterised in that said device (1) is provided movably along the longitudinal direction (Y) of said sheet (6) and said element (4), so as to allow measurement of several folding angles along the longitudinal direction (Y) of the sheet (6).

6. Device according to claim 1 characterized and that several devices (1) are positioned side-by-side along the longitudinal direction (Y) of said sheet (6) and said element (4), so as to allow measurement of several folding angles along the longitudinal direction (1) of the sheet (6).

7. Folding machine for folding a sheet (6,25,26) between two elements (4,24,7) of the folding machine, characterised in that the folding machine comprises at least one device (1) according to claim 1, said device (1) being mounted on a side of an element (4,24,7) of the folding machine.

8. Folding machine for folding a sheet (6,25,26) between two elements (4,24,7) of the folding machine, wherein the folding machine comprises two devices (1) for measuring a folding angle wherein each device (1) comprises a measuring tool (9) for measuring, on a side of an element (4,24,7), a number of distances in a plane (28) that crosses the sheet (6,25,26) and the element (4,24, 7), said distances comprising a number of distances (D1–D5) between the measuring tool (9) and different points on the sheet (6,25,26) and a number of distances (D6–D8) between the measuring tool (9) and different points on the element (4,24,7);

means (18) for determining a distance profile (19) of the measured distances;

means (18) for determining two straight lines (21,22) based on values of the distance profile (19), and means for determining the angle (B, B1, B2) between the sheet (6,25,26) and the element (4,24,7) from the angle between the two straight lines (21, 22), so as to determine the folding angle (A) of the sheet (6,25,26) as a function of the thus determined angle (B, B1, B2) between the sheet (6,25,26) and the element (4,24,7), means (12) for mounting the measuring tool (9) for measuring a number of distances in a plane (28) that crosses the sheet (6,25,26) and the element (4,24,7) perpendicular to the longitudinal direction (Y) of the sheet (6,25,26) and the element (4,24,7), said devices (1) being mounted on different sides of an element (4,24,7) of the folding machine.

9. Folding machine according to claim 7 wherein the element (4,24,7) comprises a support die for supporting the sheet (6,25,26) in a folding machine.

10. Folding machine according to claim 8, characterised in that the element (4,24,7) comprises a support die for supporting the sheet (6,25,26) in a folding machine.

* * * * *